Sept. 23, 1952  F. H. LOTT  2,611,851
HEATED LUNCH PAIL

Filed July 27, 1950  2 SHEETS—SHEET 1

Inventor
Frank H. Lott

By Clarence A. O'Brien
and Harvey B. Jacobson
Attorneys

Sept. 23, 1952  F. H. LOTT  2,611,851
HEATED LUNCH PAIL

Filed July 27, 1950  2 SHEETS—SHEET 2

Inventor
Frank H. Lott
By Clarence A. O'Brien
and Harvey B. Jackson
Attorneys

Patented Sept. 23, 1952

2,611,851

UNITED STATES PATENT OFFICE 2,611,851

HEATED LUNCH PAIL

Frank H. Lott, Lebanon, Oreg.

Application July 27, 1950, Serial No. 176,201

2 Claims. (Cl. 219—35)

This invention relates to improvements in lunch pails or boxes.

An object of this invention is to provide a device which is capable of heating the food used as lunch or capable of retaining the heated food warm, as opposed to a portable cooker.

A further object of this invention is to provide a casing which has compartments therein adapted to support various articles, for example, sandwiches, a Thermos bottle, and other items, a tray which is removably disposed in the casing and has legs thereon, said tray accommodating a heating element whereby the tray may be removed for use as a table and then disposed in the casing used to supply heat to retain the lunch of an individual reasonably warm.

Ancillary objects and features of importance will become apparent in following the description of the illustrated form of the invention.

Figure 1:
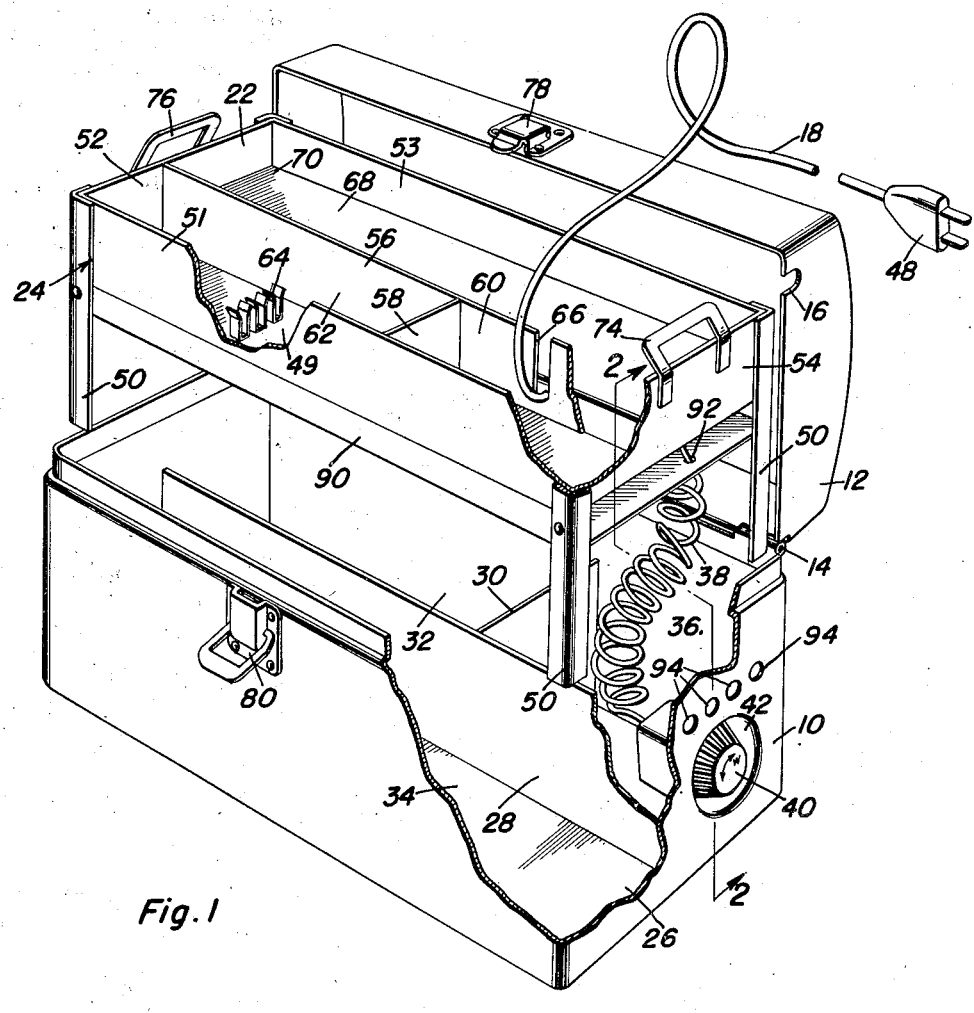
Figure 1 is a perspective view of the device in the open condition, portions being broken away in section to illustrate detail of construction.

In carrying out this invention, there is provided a casing or housing 10 having a lid 12 hinged, as at 14, thereon. A side of the closure 12 is provided with a notch 16 through which the electrical conductor 18 is adapted to pass. The conductor is attached at its inner end to the heating element 20 which is located in the compartment 22 of a removable tray, generally indicated at 24.

The casing 10 has a bottom 26 and a longitudinal, vertically rising partition 28 disposed thereon. A transverse partition 30 joins the vertical partition 28 and is attached to the rear wall of the casing to thereby divide the housing into the compartments 32, 34, and 36. The compartments 32, and 34 are adapted to support any suitable articles, such as sandwiches and a Thermos bottle. The compartment 36 supports the coil 38 of wire which is connected at one end to the rheostat 40 located in a recess 42 in one wall of the casing 10. The rheostat may be of the switch type, that is, a type which has incorporated thereon not only a rheostat but a switch in order to control the operativeness of the heating element 20. The opposite end of the coil 38 is attached to the heating element and is appropriately connected to the wire 18 having the plug 48 at the end thereof for convenient insertion in a conventional outlet for current.

The tray 24 is provided with a bottom 49 and has four legs 50 at the corners thereof. Vertically rising sides 51, 52, 53, and 54, respectively, are attached to the bottom 49 and a longitudinal partition 56 is located between the two end walls 52 and 54. A transverse partition 58 is connected to the side 51 and to the longitudinal partition 56 in order to define the chambers 60 and 62. It is recommended that the compartment or chamber 62 be used to hold articles of cutlery, inasmuch as the spring fingers 64 are disposed therein for this purpose. The compartment 60 is a cord compartment in order to hold the wire 18 after it passes through the slot 66 formed in the longitudinal partition 56.

The compartment 68 which is the one within which the heating element 28 is disposed has a covering 70 for the heating element disposed therein. It is adapted to hold any article to be kept warm, this depending largely on the prerogative of the user of the device.

Handles 74 and 76 are attached to the sides 54 and 52 for facility of lifting the tray 24 from the casing 10.

A conventional latch including the portions 78 and 80 is operatively connected with the case and the closure 12 in order to releasably hold it in the closed condition. A handle 82, preferably leather, or other heat-resistant material, is attached to the closure 12 for facility of carrying the device from one place to another.

There is a horizontal plate 90 attached, as by means of rivets, to the legs 50 of the tray 24 and this plate is located below the bottom 49 of the tray. There is an opening 92 in the plate 90 through which the coil 38 passes, there being ample wire in the coil to separate the tray from the housing 10 without the necessity of unplugging or unfastening the wire.

Figure 2:
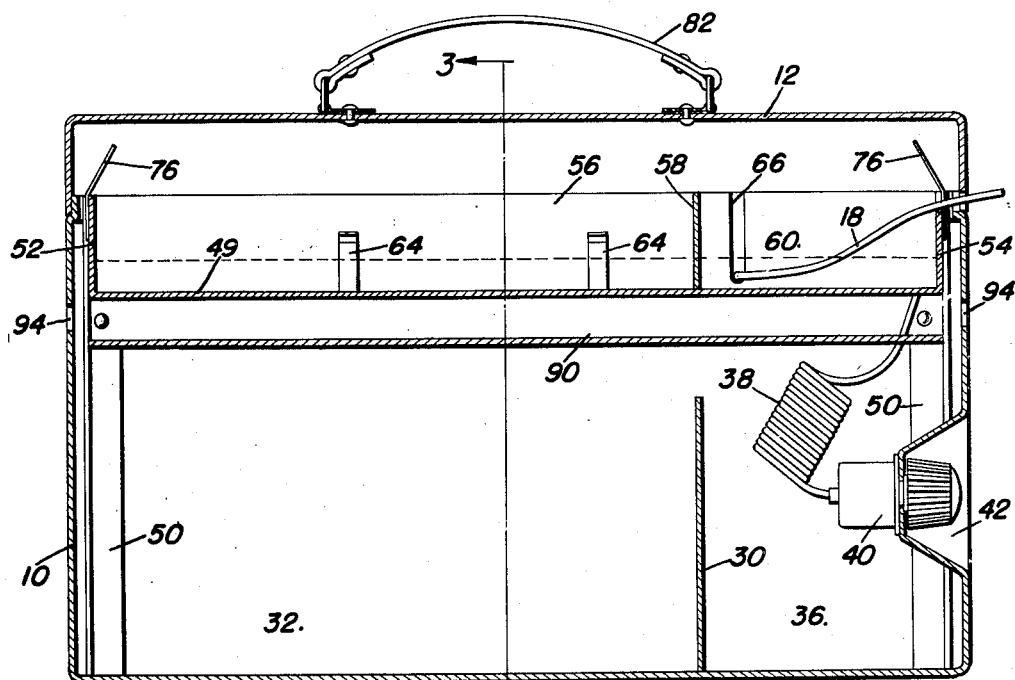
Figure 2 is a sectional view taken substantially on the line 2—2 of Figure 1 and in the direction of the arrows.
Figure 3:
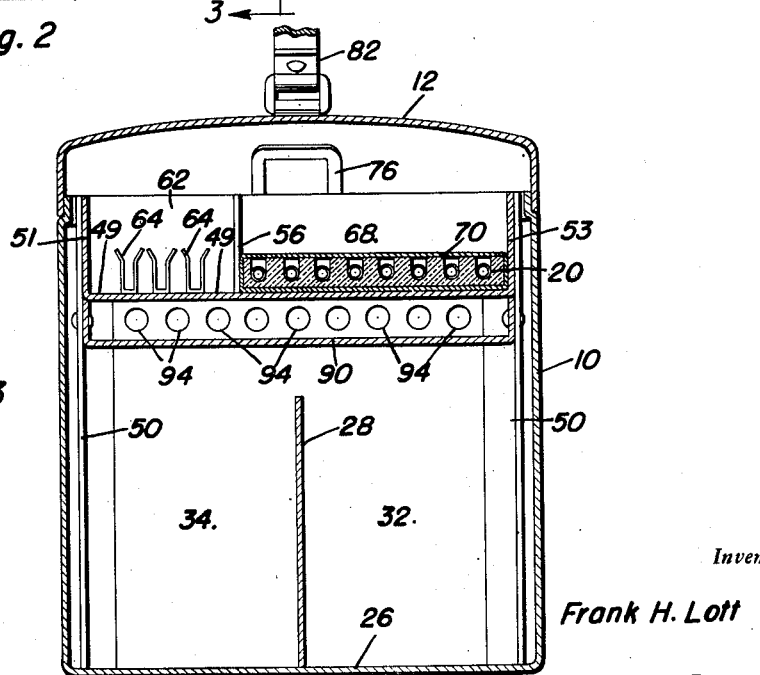
Figure 3 is a transverse sectional view taken substantially on the line 3—3 of Figure 2 and in the direction of the arrows.

The purpose of the plate is to define a heat chamber or deflector and also to lend rigidity to the construction. When the tray 24 is disposed in the housing 10, as disclosed in Figure 2, the plate 90 is located below the ventilation apertures 94 which are formed in the end walls of the housing or casing 10.

In operation, the workman's lunch is arranged in the housing and the tray disposed therein. Then any other articles which may be deemed desirable are arranged in the top part of the device, that is, in the tray 24.

When the worker arrives at work, the plug 48 is placed in an outlet in order to retain the food warm. To eat the lunch, the tray 24 is simply lifted and placed conveniently.

Having described the invention, what is claimed as new is:

1. In a heated lunch box to retain food warm, a casing having a closure operatively connected therewith, a tray removably disposed in said casing, partitions in said casing to separate said casing into compartments to accommodate various articles of food and confections and implements, said tray being located above said compartments and constituting a lid for said compartments, means to heat the interior of said casing, air discharge openings located below said tray and in said casing, a plate carried by said tray and disposed below said openings to thereby form a heat deflector, said tray having legs supporting said tray above said compartments and to support said tray at a place remote from said casing, said heating means being secured to said tray and located above said air openings when said tray is disposed in said casing and located above said heat deflector, a heat control device secured to said casing, said deflector having an aperture, and an electric wire extending from said heat control device through said aperture and connected to said heating means.

2. The combination of claim 1, and said closure having an electrical conductor receiving notch therein to constitute a passage to accommodate an electrical conductor to engage an electrical source.

FRANK H. LOTT.

REFERENCES CITED

The following references are of record in the file of this patent:

UNITED STATES PATENTS

| Number | Name | Date |
|---|---|---|
| 1,093,110 | Christopher | Apr. 14, 1914 |
| 1,850,202 | Gerhardt | Mar. 22, 1932 |
| 2,150,492 | Cory | Mar. 14, 1939 |
| 2,187,196 | Douglass | Jan. 16, 1940 |
| 2,274,285 | Walker | Feb. 24, 1942 |
| 2,504,132 | Jones | Apr. 18, 1950 |
| 2,505,405 | Jarboe | Apr. 25, 1950 |
| 2,513,218 | Turnipseed | June 27, 1950 |
| 2,545,127 | Wnuk | Mar. 13, 1951 |

FOREIGN PATENTS

| Number | Country | Date |
|---|---|---|
| 571,093 | France | May 12, 1924 |